United States Patent
Peralta (10) Patent No.: US 7,919,878 B2
(45) Date of Patent: Apr. 5, 2011

(54) ELECTRICAL ENERGY GENERATION USING HYDRO-VOLTAIC (HV) CELLS

(76) Inventor: Eduardo J. Peralta, Santa Ana, CA (US)

( * ) Notice: Subject to any disclaimer, the term of this patent is extended or adjusted under 35 U.S.C. 154(b) by 0 days.

(21) Appl. No.: 12/657,070

(22) Filed: Jan. 13, 2010

(65) Prior Publication Data

US 2010/0176596 A1 Jul. 15, 2010

Related U.S. Application Data

(60) Provisional application No. 61/204,935, filed on Jan. 13, 2009.

(51) Int. Cl.
*B60L 11/02* (2006.01)
(52) U.S. Cl. .......................... 290/43; 290/54
(58) Field of Classification Search .................. 415/3.1; 60/398, 698, 495–500, 641.7; 416/85; 290/42, 290/43, 45, 54, 1 R
See application file for complete search history.

(56) References Cited

U.S. PATENT DOCUMENTS

| | | | | |
|---|---|---|---|---|
| 3,934,573 A | * | 1/1976 | Dandini | 126/679 |
| 7,303,581 B2 | * | 12/2007 | Peralta | 623/3.27 |
| 7,435,503 B2 | * | 10/2008 | Cohen et al. | 429/448 |

* cited by examiner

*Primary Examiner* — J Gon
*Assistant Examiner* — Iraj A Mohandesi
(74) *Attorney, Agent, or Firm* — Leonard Tachner (57) ABSTRACT

Inverse magneto hydrodynamics is employed to exploit natural movement of ocean water at coastal facilities using arrays of tubes to channel the water through orthogonal magnetic fields to generate DC voltage. Each such tube houses a plurality of serially arranged hydro-voltaic cells to produce electrical energy without mechanical movement. The tubes are preferably arranged to produce improved land use efficiency as compared to other known renewable energy generating systems such as photo-voltaic and wind turbines. A pumped salt water version is also disclosed.

9 Claims, 6 Drawing Sheets

FIG. 7 ic # ELECTRICAL ENERGY GENERATION USING HYDRO-VOLTAIC (HV) CELLS

CROSS-REFERENCE TO RELATED APPLICATIONS

This application claims priority from Provisional Patent Application Ser. No. 61/204,935 filed Jan. 13, 2009.

BACKGROUND OF THE INVENTION

1. Field of the Invention

The present invention relates generally to the field of electrical energy generation from renewable, pollution-free sources. The invention herein relates more specifically to the generation of electrical energy from the motion of ocean water through hydro-voltaic cells.

2. Background Art

Energy harvesting has become a subject with increased importance as the needs of the world's population begin to stretch the available energy supply. As a result, a wide range of potential renewable sources have been explored as possible contributors to the total energy "pool". A variety of techniques have been developed by the community to extract as much energy as possible from each one of these sources. The most common ones described are based on sunlight, wind, ocean waves and tide currents, as well as geothermal heat. To be effective, researchers are always looking for "renewable resources" that do not disrupt or pollute the environment and are affordable in construction and deployment. The present invention uses the water carried by ocean waves to produce electric power. Although harvesting ocean waves is not a new topic, the approach presented here is new and very different from what has been proposed in the past. However, just as in the past, the invention herein makes use of a free and pollution free renewable energy source. This concept is based on the principle of "magneto hydrodynamics" (MHD) which addresses the forces produced on electric charges that move in the presence of orthogonal electric and magnetic fields. A full description of MHD (both theory and analyses) is provided in Applicant's artificial heart patent, U.S. Pat. No. 7,303,581 to Peralta.

SUMMARY OF THE INVENTION

Figure 1:
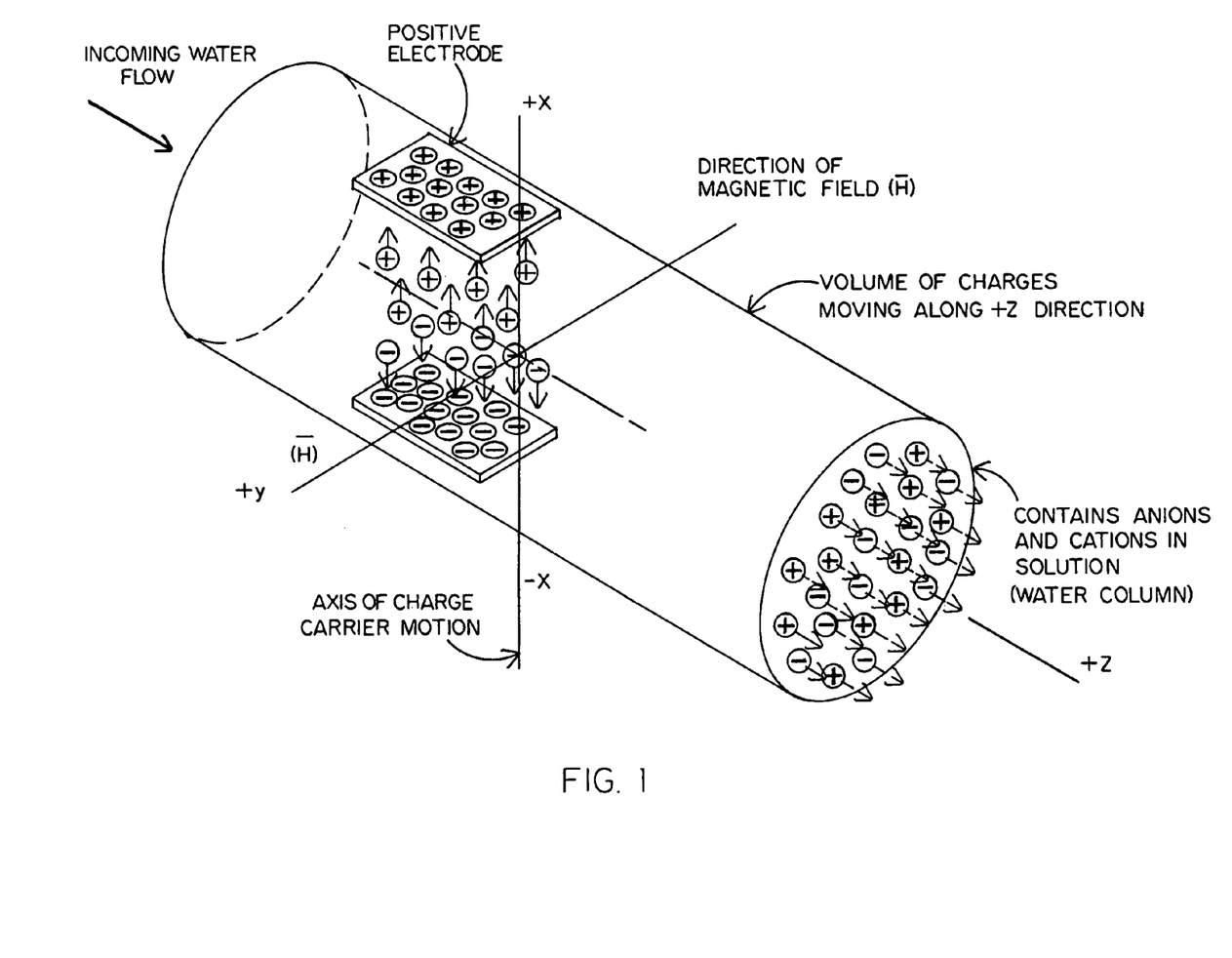
FIG. 1 is a schematic/graphical illustration showing the hydro-voltaic cell principle.

Based on the heart's research and its "successful" demonstration, it has been possible to postulate an "inverse" magneto hydrodynamics (IMHD) principle where an "external"/artificial force "moves" charge contained in a liquid (an electrolyte) past a region where a magnetic field is oriented orthogonally to the direction of fluid flow, with a resulting "separation" of charges being predicted, such that all charges move along the quadrature axis, with the anions moving in one direction while the cations move along the same axis, but in the opposite direction, as shown graphically in FIG. 1 which shows a volume of charges moving along the z axis as a result of the "external" force which for the postulated IMHD principle represents an "artificial" Lorentz force. That is, a force that "moves" charges in a liquid (the electrolyte) past a region where a magnetic field is oriented orthogonally to the direction of the fluid flow. Then, a separation of charges is predicted with the anions moving in one of the quadrature axes, with the cations moving along that same axis, but in opposite direction. If we let each of these charges accumulate at an "equi-potential" surface (a conductor), then the collection of anions would define a negative electrode as the cathode, and, on the opposite end of the same axis, the collection of cations define the positive electrode, or anode. The resulting potential difference between the two electrodes produces a DC voltage denoted by $V_b$ as depicted in FIG. 1. To test the predictions made, an experiment was designed and formulated as discussed below.

Definition of the Hydro-Voltaic Cell and the Basic Experiment

Figure 2:
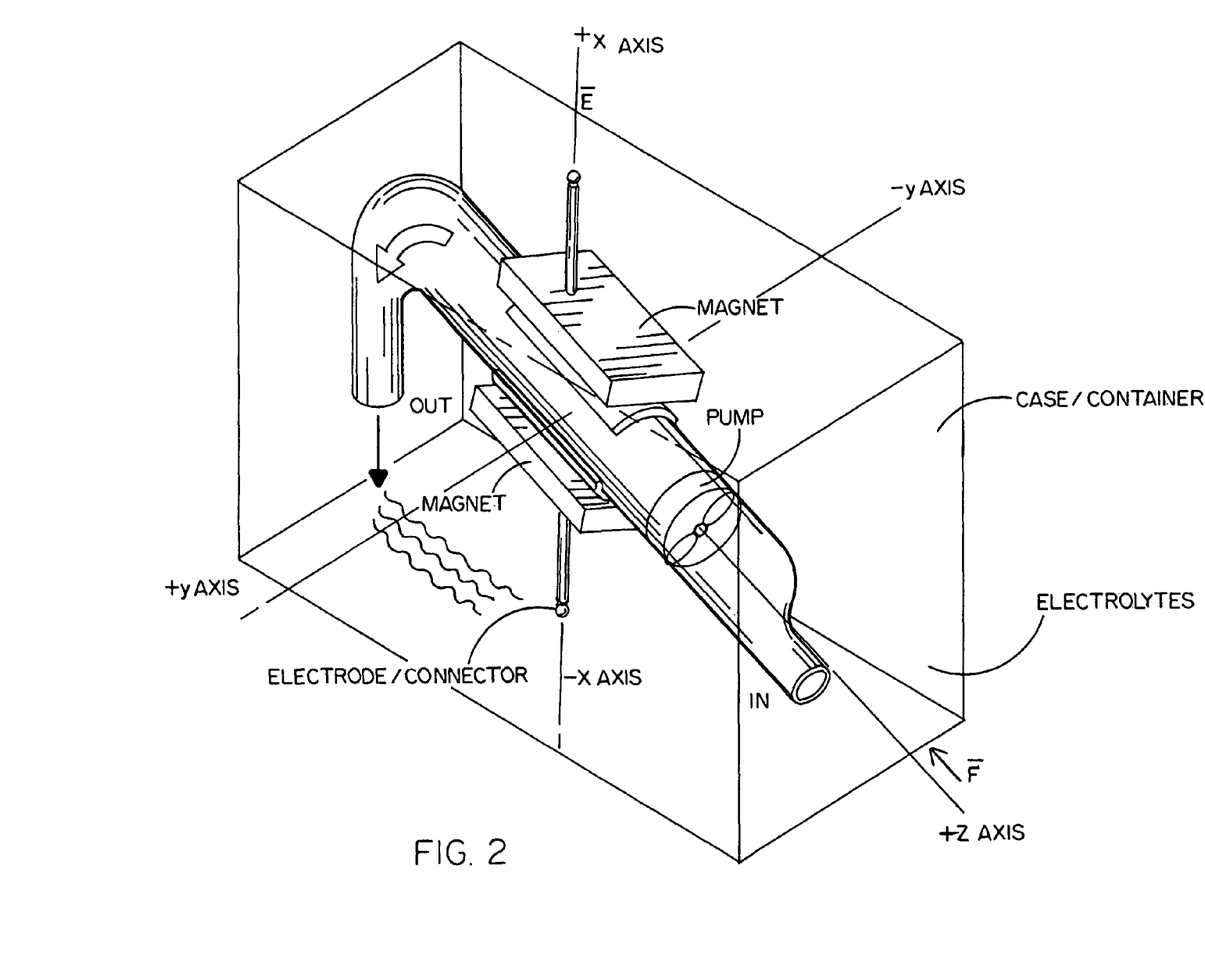
FIG. 2 is a schematic view of a single hydro-voltaic cell flow tube.

The experimental arrangement follows approximately the configuration shown in FIG. 2. The enclosure tank holds a "centrifugal/radial" water pump with a bottom mounted inlet screen and a side-mounted outlet which is connected to the input port of the power tube. The output of the tube allows the water to return to the tank to establish a closed circuit water re-circulation system. The power tube, complete with its two magnets, electrodes, ports and terminal connecting posts are "supported" within the tank by a separate plastic structure that holds it firmly in place while the pump is in operation to pump the electrolyte solution.

POWER TUBE: A straight section of vinyl tube 5/8 inch I.D.×8 inches in length.

Tank: A small, rectangular glass box aquarium with a maximum capacity of two gallons. A volume of only 0.8 gallons is needed to conduct the experiment.

Electrodes: Two rectangular aluminum electrodes (3.5 cm long×1.7 cm in width) separated by a 1 cm gap along the axis of the tube so as to present minimal blockage and maintain an approximate laminar flow.

WATER PUMP: A "centrifugal/radial" unit (Power Head 600) aquarium pump with adjustable flow rate (0 to 3 gpm) capable of using salt water, and powered by a household voltage.

ELECTROLYTE: The tank is partially filled (0.8 gal.) with a very "dilute" solution of water and table salt that provided a DC resistance of 1 kΩ between the electrodes and a "resistivity" for the solution of p=60Ω meters that had a slight salty taste (much less than sea water).

MAGNETS: Two properly oriented permanent magnets were aligned with the proper field axis orientation to the electrode ensemble. The magnets had an approximate flux density, B=5 T EXPERIMENTAL RESULTS: As soon as the pump is turned on and saline begins to pass the electrode area, a voltage ($V_b$) is detected at the pair of terminals of the HV cell achieving a value of 45 mv DC that "remains stable" as long as the flow rate through the power tube remained constant. If flow rate, or salinity changes, the value of $V_b$ changes as well.

Applicant has observed $V_b$ voltage as high as 90 my with the experimental setup described here. With these results obtained, Applicant has proven the two postulates that leads us to "define" IMHD:

1. The "predication" of $V_b$ appearing across the terminals, and

2. The "stability" of $V_b$ as long as the electrolyte "moved" past the electrode region.

Since the experimental results confirm the theoretical predictions made for the IMHD principle, we can now define a "unit" HV cell having the physical properties defined above, and capable of "generating" DC voltage from the passage of salt water through the "power tube" with a "nominal" magnitude of $50 \cdot 10^{-3}$ volts.

Now that we defined the unit HV cell, it is possible to use a multiplicity of cells connected in series, and build up the voltage produced by the ensemble. This is analogous to the approach taken with "photovoltaic" (PV) cells, when a single half-square inch silicon cell, when deployed in "millions" of series-connected cells in "groups-of-groups" of panels, can produce voltages in the Kilovolt range that lead to large energy supply system applications. Now, using the same approach, the Applicant has investigated a variety of applications and designs for HV electric power generation systems.

BRIEF DESCRIPTION OF THE DRAWINGS

The various embodiments, features and advances of the present invention will be understood more completely hereinafter as a result of a detailed description thereof in which reference will be made to the following drawings.

BRIEF DESCRIPTION OF A PREFERRED EMBODIMENT

Of all the applications, the most urgent one to help ease the current energy crisis is the Electric Power Plant. As such, we will describe and present its definition as The SEAHORSE POWER PLANT. But first, to be able to connect several HV cell units in series, we need to turn our attention to the "methodology" required. This gave rise to a structure that we have called "the power tube". Therefore, let us consider its evolution and construction details.

The Power Tube

Figure 3:
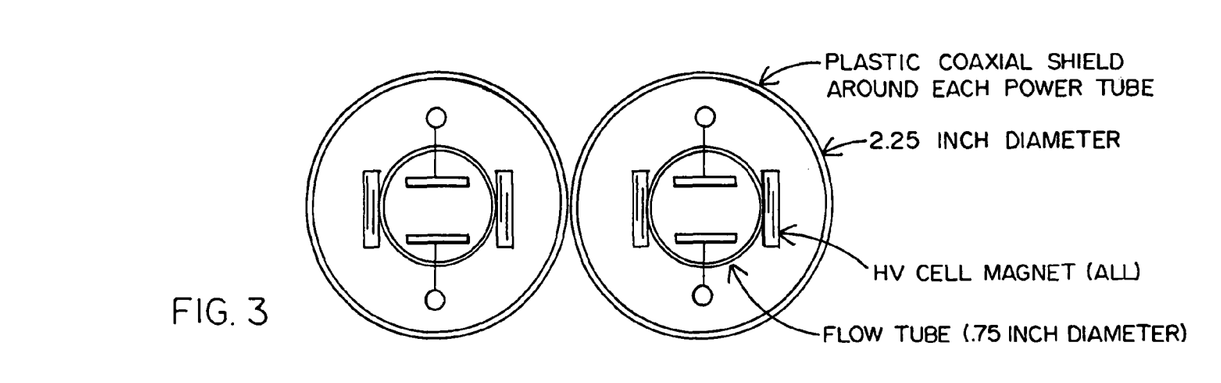
FIG. 3 is a cross-sectional view of a pair of adjacent power tubes.

In the "photo-voltaic" (PV) systems, it is not uncommon to find series connections of hundreds of millions of unit PV cells for example, the "FED-EX" system which covers 2 acres with 200 million PV cells in 667 panels to produce 911 kv of electric energy. Whereas the connection of PV cells is a well-understood technology, the hydro-voltaic (HV) cells requires a special approach that must take into account the "three-dimensional" nature of the HV cell. Since the required number of HV cells cannot be held by a single flow-tube, we use a multitude of tubes arranged in a "stack" with stubs in both vertical and horizontal groups. With such an arrangement, there are provisions to eliminate interference between adjacent tubes in such a way that each tube acts as an "independent" unit holding a number of HV cells, but yet is completely isolated from its neighboring tubes. One way to accomplish this is to "enclose" each flow tube within a "coaxial" "shield" to produce a composite/coaxial power tube where water can flow through the center flow tube, to produce all the voltages, allow for electrical interconnections between each of the cells in the series "string", and yet be shielded from the corrosive effects of the saltwater. A cross-sectional view of two adjacent power tubes is shown in FIG. 3. Note that in the deployment of "PV" systems we use "groups-of-groups" of panels to harvest the sunlight using a large area, while in the "HV" systems we use "stacks-of-stacks" of tubes to form a "cube" which we call the "HARVESTING CORE" (HC).

Details and Analysis of the Harvesting Core (HC)

Figure 4:
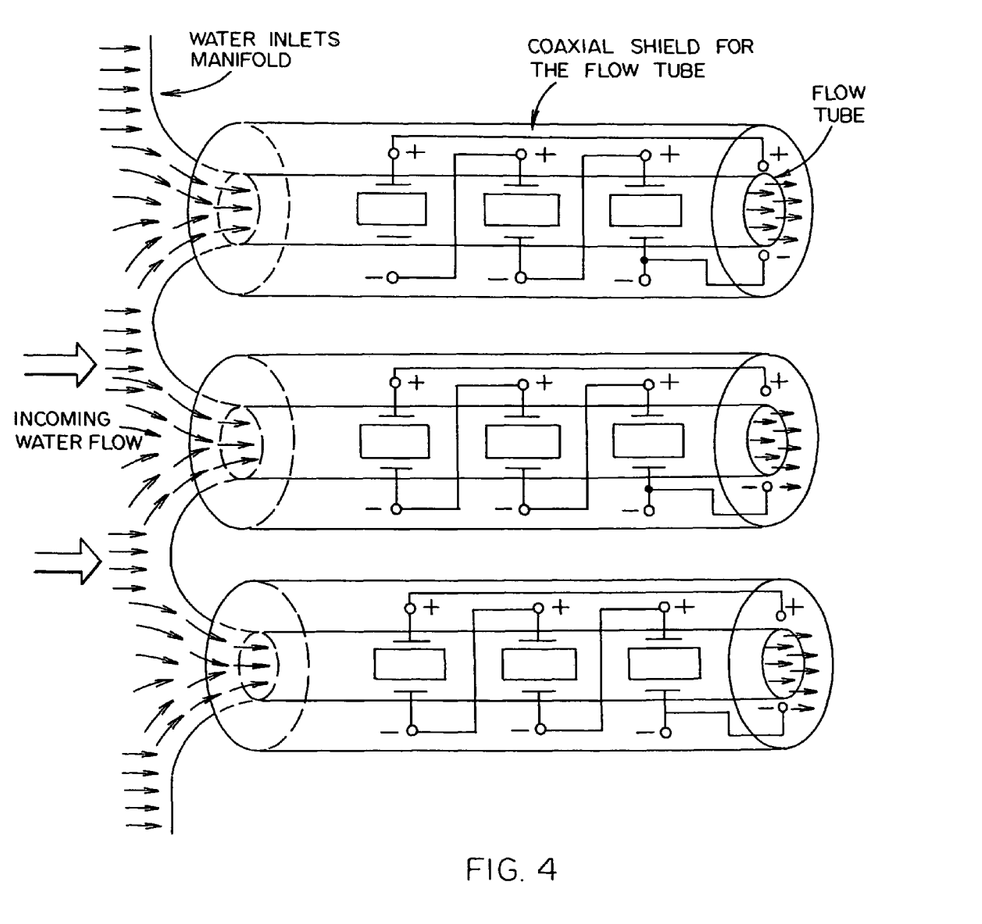
FIG. 4 is a plan view of three adjacent power tubes with an input manifold.

The harvesting core is a "cube" composed of an array of vertical columns and horizontal rows of coaxial power tubes. The front face is a two-dimensional distribution of circular openings. Since this is the water entrance face for the core, there are provisions for controlling the "direction" of the water entering into each flow tube of the coaxial power tube, while at the same time "blocking" any water from flowing through the "interstitial" spaces between coaxial shields which, if allowed, would decrease the effectiveness of the core as a result of a water "bypass" effect. A structure which accomplishes both of those functions is a simple "entrance manifold" made of a material such as molded plastic, as shown in FIG. 4 which also shows the interconnection of the HV cells.

Harvesting Core Power Output Calculations

Figure 5:
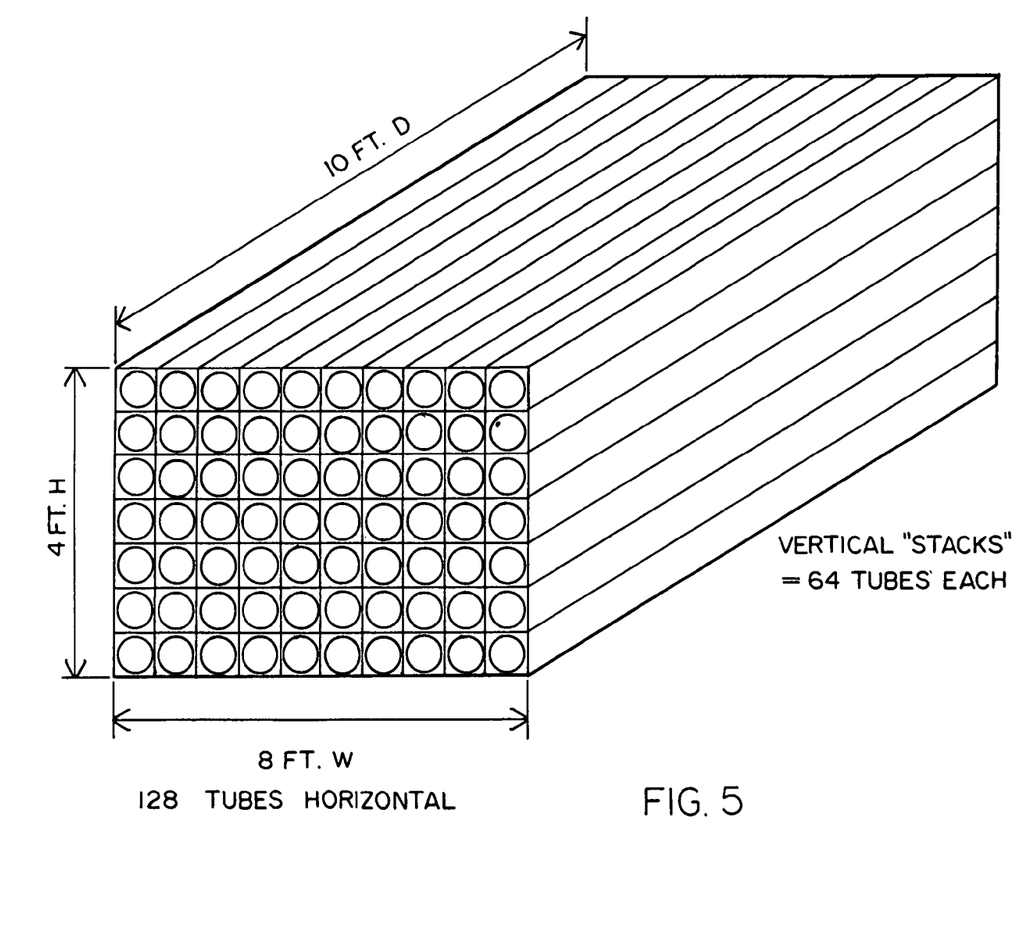
FIG. 5 is a three-dimensional view of a small harvesting core.

Let us consider a core with the dimensions shown in FIG. 5, given as: (4 ft H,×8 ft W,×10 ft D). Because the ground "footprint" is only 80 ft$^2$, this is called a "small core" with an area (Ac=2·10$^{-3}$ acres) using the 2.25 inch coaxial power tubes, we have the following:

The vertical dimension, H, contains $$\frac{48 \text{ in}}{2.25 \text{ in}} = 21$$

tubes in each vertical "stack".

The horizontal dimension W contains=43 tubes side-by-side.

The total number of tubes $W_t$=W×H−(43×21)=903 tubes per core.

Along the D dimension, all the tubes are 10 ft. long and each contains 15 HV cells producing a voltage of $$750 \cdot 10^{-3} \frac{\text{volts}}{\text{tube}}$$

(using the "nominal" 50 my per cell).

Now, the total number of cells in the core is $$N_T = n_t \times 15 = 13{,}545 \frac{\text{cells}}{\text{core}}$$

Therefore, by "itself" the core produces a voltage, $V_oc$=677.3 volts.

Figure 6:
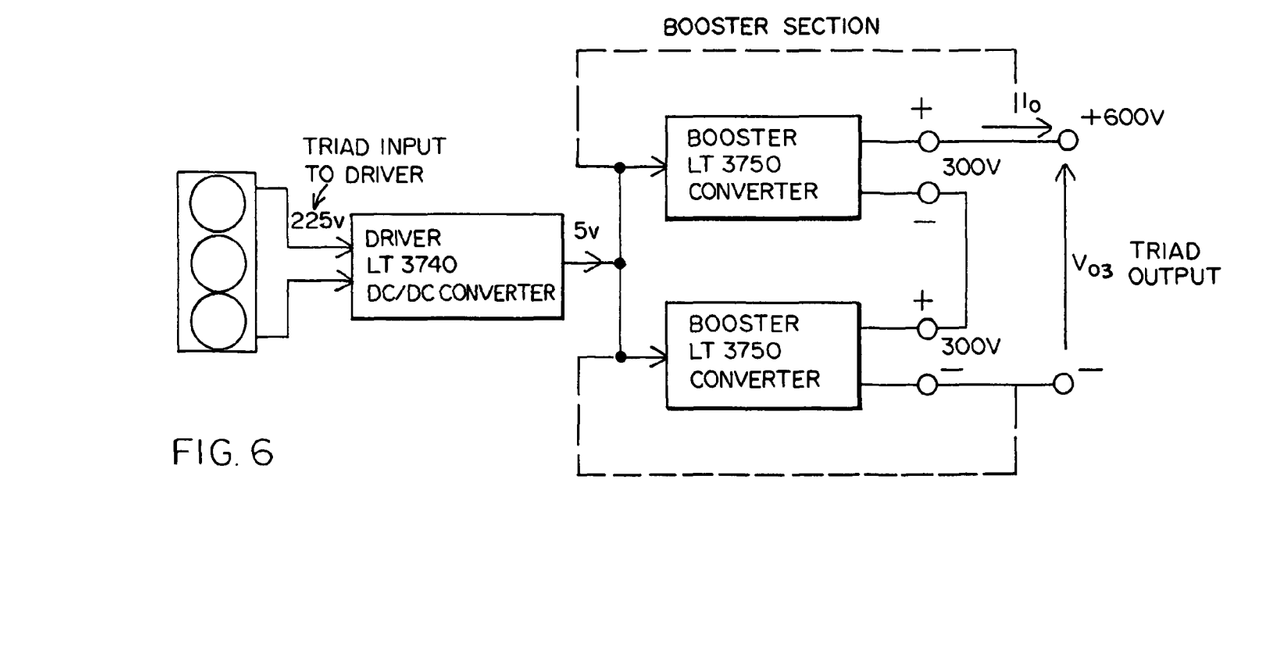
FIG. 6 is a block diagram of a triad booster circuit.

This core voltage can be increased in the following way:

a. First "subdivide" all the tubes in the core into "groups" of 3 each (called "triads"). The number of triads in the core is then $$N3 = \frac{WT}{3} = \frac{903}{3} = 301$$

triads. Each triad produces a voltage of $$(750 \cdot 10^{-3} \times 3) = 2.25 \frac{\text{volts}}{\text{triad}}$$

b. This voltage can now be used as the input to a DC/DC converter such as a Linear Technology Corp. (LT) model LT 3740 which can operate with inputs as low as 2.2 volts and deliver an output of 5 volts. This output can then drive an LT 3750 which can produce outputs exceeding 400 volts, easily "adjustable" by a simple resistive voltage divider. All these units come in very small 10 lead MSOP packages. The 3750 unit has a power rating "specification" of 84 watts. A simplified block diagram of the process to "boost" the output voltage of the core by "boosting" each of the "triads" of the core is shown in FIG. 6. With this circuit, the new output of each triad is $V_{03}=600$ volts. Since each 3750 converter has been adjusted to deliver 300 volts, the converter will "deliver" a current output, $I_o$, given by $$I_0 = \frac{84 \text{ watts}}{300 \text{ volts}} = 0.28$$

amps which allows us to maintain the power rating specifications of the unit. The new output voltage from the core, becomes $$V_{oc} = \left(\frac{600 \text{ v}}{\text{triad}} \times \frac{301 \text{ triads}}{\text{core}}\right) = 181 \cdot 10^3 \frac{\text{volts}}{\text{core}}.$$

The power available from each triad is then $$P_{03} = (V_{03} \times r_0) = \frac{600 \text{ v}}{\text{triad}} \times 0.28 \text{ amps} = \frac{168 \text{ watts}}{\text{triad}}.$$

Therefore, the total available power from the core is given as $$P_{0C} = (P_{03} \times n_3) = \left(\frac{168 \text{ watts}}{\text{triad}} \times 301 \frac{\text{triads}}{\text{core}}\right) = 51 \cdot 10^3 \frac{\text{watts}}{\text{core}}.$$

Now by "deploying" a number of cores as a "Distributed Power System", as is often done in renewable energy systems, we have for a 5,000 core ensemble, a power output of $P0=255 \cdot 10^6$ watts and this is obtained from a system that occupies a total area $$A_r = \left(2 \cdot 10^{-3} \frac{\text{acres}}{\text{core}} \times 5 \cdot 10^3 \text{ cores}\right) = 10 \text{ acres}$$

which is a "very" small area when compared to "all" of the other known renewable energy systems shown in Table 1.

Now, let us consider a "Large Core" with the following dimensions: 4 ft H×30 ft W×10 ft D), with a ground footprint area, $4_c=300 \text{ ft}^2=(7.5 \cdot 10^{-3}$ acres). Following a similar analysis as was given for the small core, it can be shown that this large core, when deployed as a "Distributed Power Complex" of 6,000 cores, can produce a power output, $P_0$, of 1.13 Gigawatts ($1.13 \cdot 10^9$ watts) requiring an area of 45 acres. Again, this is a "miniscule" area when compared to the various other known renewable energy systems with comparable power output.

The Seahorse Power Plant: Definition and Deployment

Figure 7:
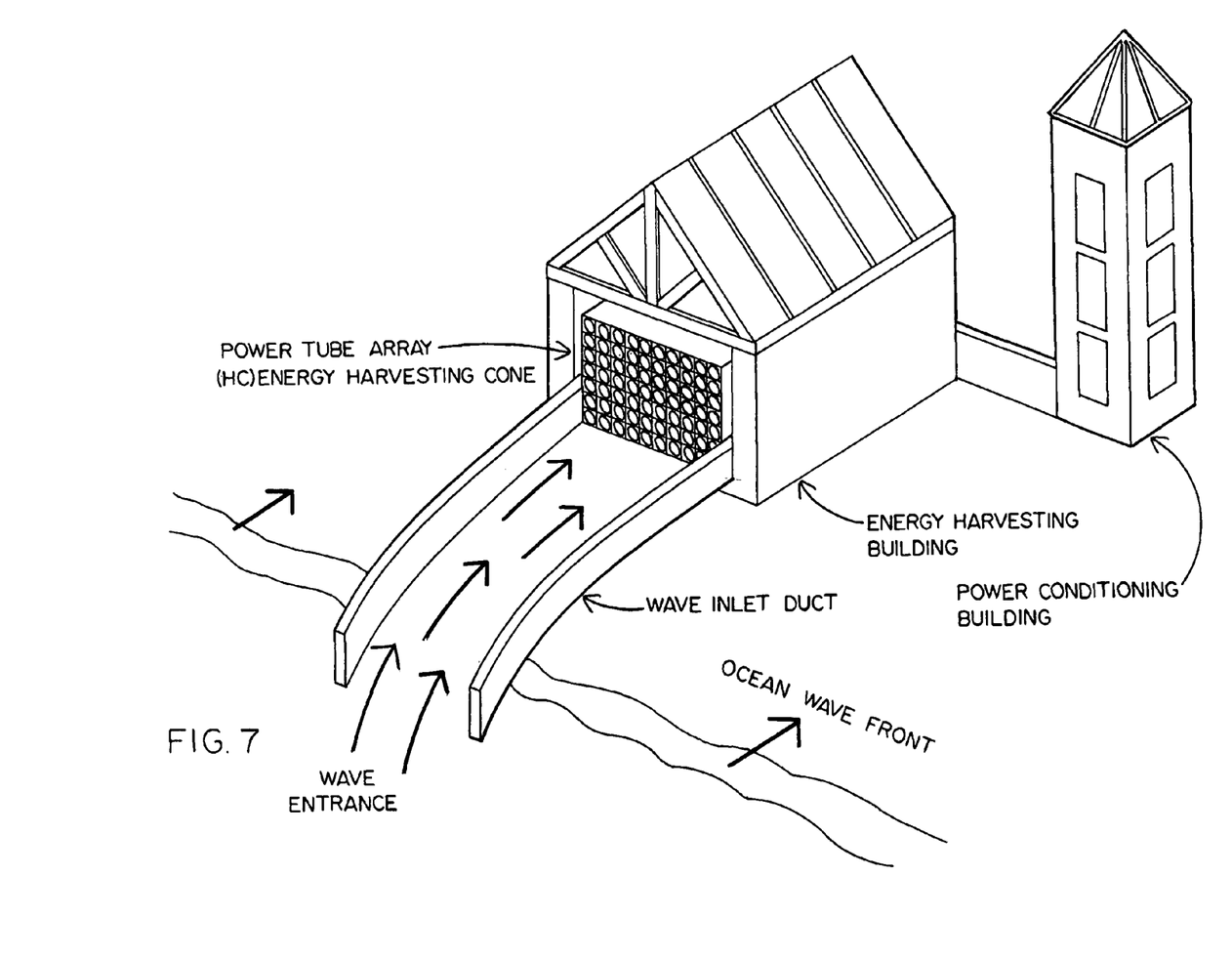
FIG. 7 is a simplified view of a sea-side energy harvesting station.

To help describe the architecture and layout of a sea-side electric power generating system that uses the hydro-voltaic (HV) principle of energy harvesting, we have included a pictorial illustration of a possible site layout, as given in FIG. 7. The sea water arrives at the entrance of the inlet channel of a harvesting building and leads the water to the harvesting core (HC). Each wave that arrives sends sea water through the core which produces the output voltage that undergoes "power conditioning" to produce useful output. For ease of reference, the concept has been given the acronym of "SEA-HORSE" which stands for Sea Harvesting the Ocean Resource of Surf Energy. In addition to selecting the proper size core to achieve a specific power output, the Sea Horse concept can be extended and expanded as a "Distributed" power station "Complex" "scalable" to any size that can lead to very large power production.

Performance Evaluation of Various Renewable Energy Systems

Because the hydro-voltaic (HV) technology represents a new approach to energy harvesting, it is important to evaluate its performance and to find its proper "niche", or rank among all the other electrical energy generating techniques currently in use. Because there is a large variety of renewable energy sources, to find a "common denominator" for evaluation can become an exhaustive and lengthy process. Therefore, we perform the evaluation based on the following approach: We use only these three most important energy sources as follows:

1. SUN: Both photo-voltaic (a.k.a., solar cells), and solar-thermal systems utilizing "mirror farms" of heliostats.

2. WIND: In the form of large wind turbines deployed on land only.

3. OCEAN: Using the hydro-voltaic (HV) technology for both large and small core designs. Notice that we have omitted systems using "ocean kinetics" as part of the evaluation since they are "mechanical" systems.

Even with this reduced number of technologies, the number of parameters available for evaluation can grow to such a large number that, if we were to use them all, the results would be very convoluted and confusing. Therefore, we have decided to perform the evaluation based on the output power produced by the system and the area required for its deployment. The system evaluation "metric" then becomes a "figure of merit" that we have given the name "HARVESTING FACTOR" with the units of surface power density, or watts-per-unit-area, and given the symbol, "H". The results are shown in Table 1, which utilizes the data available in the open literature, up-to-date on the current status of the technologies. From Table 1 we can produce a "ranking order" as determined by the figure of merit, or "HARVESTING FACTOR" (H); Table 2 provides the summary results.

TABLE 1

SYSTEM EVALUATION CHART

| SOURCE OF ENERGY | TECHNOLOGY TYPE AND SYSTEMS | POWER PRODUCED | AREA REQUIRED | HARVESTING FACTOR FIGURE OF MERIT (w/acre, H) | NOTES/REMARK |
|---|---|---|---|---|---|
| SUN (1) | SOLAR THERMAL MOJAVE, CA 20,000 MIRRORS USED | 500 MW | 4,500 acres | H = 110 Kw/acre | To be extended to 850 MW |
| | IMPERIAL VALLEY, CA 12,000 MIRRORS USED | 300 MW | 2,700 acres | H = 110 K Acre | To be extended to 900 MW |

TABLE 1-continued

SYSTEM EVALUATION CHART

| SOURCE OF ENERGY | TECHNOLOGY TYPE AND SYSTEMS | POWER PRODUCED | AREA REQUIRED | HARVESTING FACTOR FIGURE OF MERIT (w/acre, H) | NOTES/REMARK |
|---|---|---|---|---|---|
| WIND | WIND TURBINES NORTH GERMANY SITES 2,400 TURBINES USED | 18 GW | 1920 acres | H = 9.4 Mw/acre | 200 ft. diameter turbines and 7.5 MW each |
| SUN (2) | PHOTOVOLTAIC FED-EX SYSTEM 5,700 MODULES USED | 911 KW | 2.03 acres | H = 449 Kw/acre | SITE: Oakland, CA |
| OCEAN | HYDROVOLTAIC SEA HORSE CONCEPT | | | | |
| | LARGE CORE 2,000 CORES USED | 1.13 GW | 45 acres | H = 25.1 MW/acre | Single Core (Footprint = 300 ft$^2$) |
| | SMALL CORE 1,000 CORES USED | 255 MW | 10 acres | H = 25.5 MW/acre | Single Core (Footprint = 80 ft$^2$) |

TABLE 2

POWER GENERATION EFFICIENCY RANKING

| ENERGY SOURCE | SYSTEM TYPE | POWER OUTPUT $P_0$, IN WATTS | HARVESTING FACTOR, H, IN WATTS/ACRE | RELATIVE RANK |
|---|---|---|---|---|
| OCEAN | LARGE (HV) CORE | 1.13 GW | 25.1 M | (2) |
| | SMALL (HV) CORE | 255 MW | 25.5 M | (1) |
| WIND | VERY LARGE TURBINES | 18 GW | 9.4 M | (3) |
| SUN | SOLAR (PV) PANELS | 911 KW | 449K | (4) |
| | SOLAR-THERMAL FARMS | 500 MW | 110K | (5) |

It is evident that the hydro-voltaic technology provides the highest efficiency in the harvesting process for its renewable energy source of sea water with the "wind farms" (land deployment was the only one considered), providing the next most efficient way to harvest a source of energy. A surprising fact is that the "solar cells" scored next to the lowest, namely, the "solar thermal" system farms.

SUMMARY AND CONCLUSIONS

There are several observations that can be made about the hydro-voltaic approach to electric power generation. An important feature is that an HV system represents a truly "zero pollution" concept since the water that enters the core is the same water that returns to the sea, in the same original state and condition. Because the water that enters the core is obtained from the "shallow" "lapping" water that runs to the beach, there isn't any need to disturb the algae and kelp beds on the ocean floor which can contribute to the creation of fuel oils. In a similar way, since we are not taking nor removing anything from the sea water, its "chemistry" is not disturbed and marine life (fish and shell) remains pristine. A power plant built using the HV principle is considered to be a "near term" project because it uses off-the-shelf components without the need for any breakthrough techniques. The concept can also be deployed in any region of the world with a body of salt water even if there isn't any wave action. A "submersible" pump located just off the edge of the water can be used to deliver enough water to pass through the core and produce an electric output. Such locations of the world (the Great Salt Lake, the Salton Sea, the Dead Sea, and the Aral Sea) are all able to produce electricity using this process.

Note that the entire hydro-voltaic concept, when used for the deployment of an electric power plant, represents a paradigm shift by virtue of its many attributes. For example, the fabrication costs of an HV power plant such as the Sea Horse described here, represents a "miniscule" investment when compared, for example, to the 2 to 3 "billion" dollars needed for the deployment of a solar-thermal plant with an equivalent power output. In the field of renewable energy harvesting it is not unusual to encounter proposed systems requiring hundreds of acres to deploy and this seems to be a common feature among such systems. The hydro-voltaic cell has been shown to be a "gateway" to a variety of applications in the power generating field. The most important of these applications is recognized as the harvesting of ocean energy by using the salt water that arrives at every seashore throughout the world. A power plant such as the Sea Horse represents a minimally "invasive" or "disturbing" structure on the "population" which can be deployed anyplace there is a coastline and is as "quiet" as the ocean surf. It is available "continuously" and represents a "non-interrupted" resource as consistent and "dependable" as the oceans themselves.

Since the area required to deploy an HV power plant is not excessive, it allows for greater harvesting efficiency. This effect is noticed for example, with the wind turbines of Table 1, which shows that the highest power output of all the systems (18 Gigawatts) was provided by "very" large (200 ft. diameter) turbines which deliver 7.5 Mwatts each. In the industry, these turbines are referred to as "behemoths". However, the group of 2,400 units deployed throughout North Germany consumed an area of 1,900 acres which contributed to lowering the harvesting factor, H, to 9.4 Mwatts/acre, for a third place in the relative ranking scale.

It has become evident that the HV approach to energy harvesting provides a very flexible technology that allows the designer a wide degree of freedom in the synthesis of a power generating system. For example, if a large power output is desired, then, starting with a moderate size core, an increase in "volume" of the harvesting core (HC) can yield an initial higher power output. A subsequent "multiple replication" of the HC can be used to define a distributed power complex/system with the desired output. As an illustration, consider a core with the following dimensions; (5 ft H×50 ft W×12 ft D) with a ground "footprint" area of 600 ft$^2$. It can be shown that this core can deliver $7.3 \cdot 10^9$ watts when deployed as a 20,000 unit distributed power complex system that requires only 300 acres.

The final aspects of the design are concerned with the process for "inversion" of the power from DC to AC. Fortunately this technology is very well developed at both the residential and industrial high power levels, and no surprises should be expected. Currently there are several manufacturers that provide inverters for the present markets (such as SHARP SOLAR in Palo Alto, Calif.). It is worthwhile to observe that an electric power plant constructed using the HV principle, represents a "monocoque"/homogeneous architecture that does "NOT" require any mechanical/energy conversion systems neither linear, nor rotational (e.g., a turbine) to produce electric power. The HV "DIRECT CONVERSION" will lead to much reduced service, maintenance and upkeep costs while providing high reliability. Moreover, because Harvesting Cores are configured for use along coastlines, they can be located near major population centers where they will be close to the existing electrical grids with minimal transfer losses and without requiring costly new infra-structure to connect to the grid.

Thus it will now be understood that the present invention comprises a unique new concept for generating electrical energy on a massively large scale using IMHD. Illustrative embodiments demonstrating the high land area efficiencies have been disclosed for use along coastlines and other locations where there is a natural flow of electrolyte liquid.

I claim:

1. An electrical energy generating apparatus for installation adjacent a coastal shoreline for receiving input seawater waves; the apparatus comprising:
   a three-dimensional array of electrically interconnected power tubes, each having a plurality of serially interconnected hydro-voltaic cells generating an electrical voltage in a flow tube in response to the motion of said seawater through said cells within said flow tube;
   each said cell having magnets establishing a magnetic field oriented perpendicularly to the flow of seawater through the cell and each said cell having a pair of opposed electrodes oriented orthogonally to both said flow of seawater and to said magnetic field.

2. The apparatus recited in claim 1 further comprising at least one seawater inlet manifold channeling said input seawater waves through said flow tubes.

3. The apparatus recited in claim 1 further comprising at least one DC to DC converter connected to said power tubes.

4. The apparatus recited in claim 1 wherein said three-dimensional array of power tubes comprises a rectangular core arranged in horizontally configured groups of adjacent parallel power tubes vertically stacked, one horizontal group upon another.

5. An electrical power generating apparatus configured as a flow tube for positioning in the flow of electrolytic liquid; the apparatus comprising:
   a plurality of hydro-voltaic cells each such cell having magnets establishing a magnetic field oriented perpendicularly to the flow of said electrolytic liquid through the cell and a pair of opposed electrodes oriented orthogonally to both said flow of liquid and said magnetic field;
   the hydro-voltaic cells being in a flow tube and being electrically interconnected in series for generating a combined voltage at an output.

6. The apparatus recited in claim 5 further comprising an inlet manifold for channeling said liquid through said flow tube.

7. The apparatus recited in claim 5 further comprising a DC to DC converter connected to said output for raising the combined voltage to a higher voltage.

8. The apparatus recited in claim 5 wherein said flow tube is configured for placement adjacent a body of seawater to utilize wave action to flow salt water through said flow tube.

9. The apparatus recited in claim 5 further comprising a pump for forcing said electrolytic liquid through said flow tube.

* * * * *